(No Model.)
T. LOWE.
POTATO PLANTER.
No. 273,560. Patented Mar. 6, 1883.
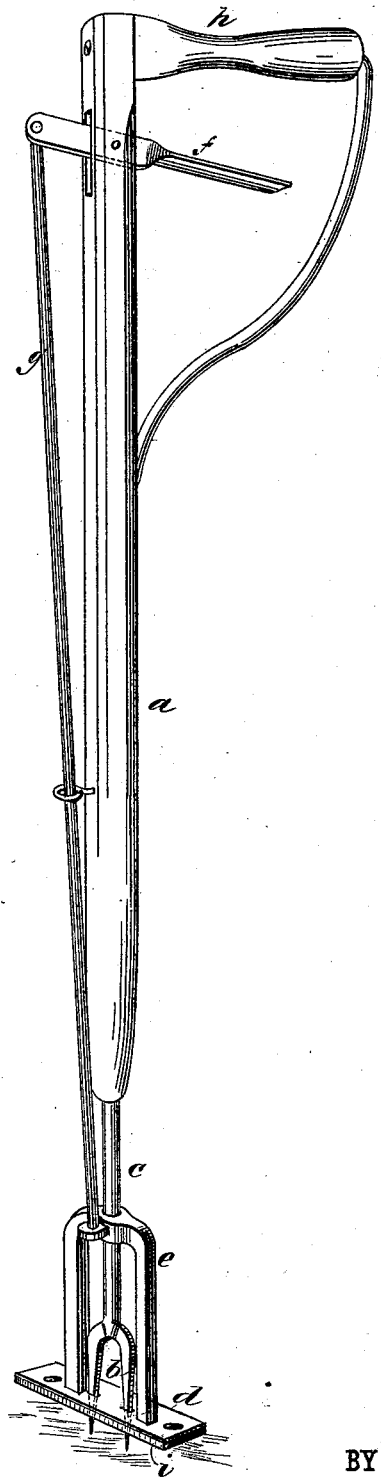

UNITED STATES PATENT OFFICE.

THOMAS LOWE, OF WILD ROSE, WISCONSIN, ASSIGNOR OF ONE-HALF TO JOHN W. FISHER, OF SAME PLACE.

POTATO-PLANTER.

SPECIFICATION forming part of Letters Patent No. 273,560, dated March 6, 1883.

Application filed November 14, 1882. (No model.)

*To all whom it may concern:*

Be it known that I, THOMAS LOWE, of Wild Rose, in the county of Waushara and State of Wisconsin, have invented a new and Improved Potato-Planter, of which the following is a full, clear, and exact description.

My invention consists of a short staff with a fork on the lower end to pick up the potatoes and a discharger thereat for pushing off the potatoes and pressing them into the ground, the discharger being worked by a lever pivoted to the staff near the upper end, and arranged with relation to a handle of the staff, so that the staff may be carried and the discharger worked by one hand, all as hereinafter fully described.

Reference is to be had to the accompanying drawing, forming part of this specification, in which the figure is a perspective view of my improved potato-planter.

$a$ represents the staff, which is preferably of wood, with a fork, $b$, of two or more parallel tines, on the lower end of a short rod, $c$, projecting downward from the lower end of the staff.

$d$ represents a discharger and presser, consisting of a short plate ranging across the tines, near the points, and fitted to slide up and down on them, and having a yoke, $e$, attached to the upper side and working on the rod $c$ for a guide, said yoke being connected to the hand-lever $f$ by the rod $g$, the lever being located near the upper end of the staff and in such proximity to the staff-handle $h$ that it can be worked by the hand in which the staff is carried.

It will be seen that by letting lever $f$ free from the hand and pressing fork $b$ on the potatoes in a basket one will be taken by the fork and may be deposited in the furrow or other place prepared for it in the ground, when it may be discharged and left by pulling up the lever $f$, and, if desired, the seed may be pressed into the ground by applying suitable pressure to the handle $h$.

In soft ground the seed may be so far pressed in that it will be covered by the earth falling in the depression made by the pusher $d$ after the latter has been withdrawn.

It will be seen that with a light and efficient device of this construction a man may guide a small plow suitable for furrowing and covering potatoes, and at the same time deposit the potatoes in the furrows from a basket mounted on the plow. In such case the seed will be deposited in the third or fourth furrow; or the furrow may be opened by going in one direction and then turning back, going the other way, to cover the seed deposited in it by the planter. The plate $d$ may be faced with rubber $i$ or other soft material to prevent crushing the seed.

Having thus described my invention, what I claim as new, and desire to secure by Letters Patent, is—

1. The combination of staff $a$, fork $b$, and discharger $d$, said discharger being connected with a working-lever $f$, located near the top of the staff, substantially as described.

2. The combination of the staff $a$, fork $b$, discharger $d$, connecting-rod $g$, lever $f$, and handle $h$, substantially as described.

3. The combination of the staff $a$, fork $b$, discharger $d$, yoke $e$, connecting-rod $g$, lever $f$, and handle $h$, substantially as described.

4. In a potato-planter consisting essentially of a fork, $b$, and discharger $d$, the said discharger, faced with leather $i$ or equivalent material, substantially as described.

THOMAS LOWE.

Witnesses:
ELISHA I. STEWART,
C. A. SMART.